(12) United States Patent
Bowen et al.

(10) Patent No.: US 10,645,463 B2
(45) Date of Patent: May 5, 2020

(54) EFFICIENT MULTICAST ABR RECEPTION

(71) Applicant: Cisco Technology, Inc., San Jose, CA (US)

(72) Inventors: Gareth Bowen, Chandlers Ford (GB); Ian Bastable, Fareham (GB)

(73) Assignee: Cisco Technology, Inc., San Jose, CA (US)

( * ) Notice: Subject to any disclaimer, the term of this patent is extended or adjusted under 35 U.S.C. 154(b) by 74 days.

(21) Appl. No.: 15/961,548

(22) Filed: Apr. 24, 2018

(65) Prior Publication Data

US 2018/0352305 A1 Dec. 6, 2018

Related U.S. Application Data

(60) Provisional application No. 62/513,328, filed on May 31, 2017.

(51) Int. Cl.

| | |
|---|---|
| *G06F 15/16* | (2006.01) |
| *H04N 21/6405* | (2011.01) |
| *H04L 29/06* | (2006.01) |
| *H04N 21/2662* | (2011.01) |
| *H04N 21/462* | (2011.01) |
| *H04N 21/845* | (2011.01) |
| *H04N 21/262* | (2011.01) |
| *H04N 21/266* | (2011.01) |

(52) U.S. Cl.
CPC ..... *H04N 21/6405* (2013.01); *H04L 65/1023* (2013.01); *H04L 65/4076* (2013.01); *H04L 65/607* (2013.01); *H04N 21/262* (2013.01); *H04N 21/2662* (2013.01); *H04N 21/26616* (2013.01); *H04N 21/462* (2013.01); *H04N 21/4622* (2013.01); *H04N 21/8456* (2013.01)

(58) Field of Classification Search
CPC .......... H04N 21/262; H04N 21/26616; H04N 21/462; H04N 21/4622; H04N 21/2662; H04N 65/4076; H04N 21/6405; H04N 21/8456; H04L 65/1023; H04L 65/607; H04L 65/4076
USPC ....................................................... 709/231
See application file for complete search history.

(56) References Cited

U.S. PATENT DOCUMENTS

| | | |
|---|---|---|
| 9,197,559 B1 | 11/2015 | Cloonan et al. |
| 2013/0132986 A1 | 5/2013 | Mack et al. |
| 2013/0179588 A1 | 7/2013 | McCarthy et al. |
| 2014/0050082 A1 | 2/2014 | Sun et al. |
| 2016/0073146 A1* | 3/2016 | Phillips ............ H04N 21/2402 725/34 |
| 2016/0269459 A1* | 9/2016 | Harden ............. H04L 65/602 |
| 2016/0286248 A1* | 9/2016 | Phillips ............ H04N 21/2385 |
| 2017/0070773 A1* | 3/2017 | Phillips ............ H04N 21/4384 |

* cited by examiner

*Primary Examiner* — Frantz B Jean
(74) *Attorney, Agent, or Firm* — Patterson + Sheridan, LLP (57) ABSTRACT

Techniques for efficiently initiating multicast data communications. Upon determining to initiate multicast network communications, embodiments determine that a first multicast group of a plurality of multicast groups is currently active. An Internet Group Management Protocol (IGMP) Join network message for a second multicast group that is currently inactive is transmitted. Upon determining that the first multicast group is currently inactive, an IGMP Join network message is transmitted for the first multicast group of the plurality of multicast groups.

18 Claims, 9 Drawing Sheets

EFFICIENT MULTICAST ABR RECEPTION

CROSS-REFERENCE TO RELATED APPLICATIONS

This application claims benefit to U.S. Provisional Patent Application No. 62/513,328, filed on May 31, 2017, which is hereby incorporated by reference in its entirety.

TECHNICAL FIELD

Embodiments presented in this disclosure generally relate to streaming content, and more specifically, embodiments disclosed herein relate to techniques for optimizing ABR streams within a network.

BACKGROUND

As video transmission systems have matured, digital video is more readily available via a variety of different communications systems and networks. Specifically, digital video, such as television programs, can be transmitted as multicast digital bit streams of video signals to users over networks. Multicast digital bit streams typically include digital video frames. A predetermined number of frames is conventionally referred to as a Group of Pictures (GOP). The GOP lengths are typically 15 or 30 frames. With more advanced video formats, such as Advanced Video Coding (AVC) and/or Windows Media 9 (WM9), the GOP length can be substantially longer in order to reduce the bit rate. In order to reduce costs and simplify the amount of effort associated with video transmission, different video compression/de-compression techniques have been developed and established.

Compressed video transmission streams typically include a variety of different compression frame types. With MPEG-2 and MPEG-4, the bit streams generally include three different types of frames including Intra-frames, Predictive frames, and Bidirectional interpolated frames. In a typical decoding process, Intra-frames (I-frames) can be decoded independently without the need of referencing another frame. Thus, GOPs typically start with an I-frame. Predictive frames (P-frames) can be decoded by referencing a previous I-frame or P-frame. Bidirectional interpolated frames (B-frames) can be predicted from a previous and a following P-frame or I-frame. For a given video stream, all three ways of coding are attempted and the best and most efficient combination is utilized. For example, a common MPEG-2 video stream can be 15 frames long and have the sequence IBBPBBPBBPBBPBB.

Typically, a video stream, such as a MPEG-2 data stream, is transmitted from a multicast source to a router and/or switch via a network, e.g., an Internet Protocol (IP) distribution network. And upon receipt of the video stream, the router then transmits the video stream to a user device, such as a set-top box. Such a router (e.g., the user's Internet gateway) can potentially receive multiple multicast video streams at one time (e.g., one or more streams for each of a plurality of broadcast channels), and client devices (e.g., dedicated streaming devices such as the set-top box, mobile devices, tablet devices, etc.) can request specific streams to be output for display.

Generally, adaptive streaming enables client devices to switch between different video and/or audio qualities during a streaming session. For example, a content distribution network could provide multiple different bitrate encodings for a given instance of video content, and client devices can transition between these different encodings as appropriate (e.g., based on the client's bandwidth capabilities and network performance). In order to accomplish a smooth transition between different encodings, many adaptive streaming formats use video segmentation, where a given video is divided into segments of a consistent length. If a client device wishes to transition to a different bitrate encoding, the client device can request the next segment from the different bitrate encoding. When transitioning between multicast and unicast communications for streaming video content, conventional solutions typically produce some amount of wasteful network traffic. For instance, a system that transitions from unicast to multicast communications for a video stream may subscribe to and begin receiving data over a multicast communications channel, while the system is still receiving unicast data for the video stream. As an example, a system that begins receiving data over a multicast channel in the middle of a video segment may ultimately end up discarding the partial video segment data, as such data may not be suitable for playback and/or may be redundant with data received over a unicast channel. Such wasted bandwidth can be particularly problematic for an already constrained network link.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

One embodiment presented in this disclosure provides a method that includes, upon determining to initiate multicast network communications for streaming video content, determining that a first multicast group of a plurality of multicast groups for the streaming video content is currently active. Additionally, the method includes transmitting an Internet Group Management Protocol (IGMP) Join network message for a second multicast group of the plurality of multicast groups that is currently inactive. The method also includes, upon determining that the first multicast group is currently inactive, transmitting an IGMP Join network message for the first multicast group.

Another embodiment presented in this disclosure provides a network device that includes a plurality of network ports and a processor configured to perform an operation. The operation includes, upon determining to initiate multicast network communications for streaming video content, determining that a first multicast group of a plurality of multicast groups for the streaming video content is currently active. Additionally, the operation includes transmitting an Internet Group Management Protocol (IGMP) Join network message for a second multicast group of the plurality of multicast groups that is currently inactive. The operation further includes, upon determining that the first multicast group is currently inactive, transmitting an IGMP Join network message for the first multicast group.

Yet another embodiment presented in this disclosure provides a content distribution network that includes a memory storing digital video content comprising a plurality of video segments, and logic. The logic is configured to assign each of the plurality of video segments to a respective one of a plurality of multicast streams, wherein each video segment is assigned to only a single multicast stream and wherein each video segment after a first video segment is assigned to a different multicast stream relative to the video segment immediately prior. The logic is further configured to generate a manifest file for digital video content. The manifest file includes a proprietary tag that specifies a next multicast stream of the plurality of multicast streams, and a time stamp at which the next multicast stream will become active. Additionally, the logic is configured to transmit the plurality of video segments for digital video content using the plurality of multicast streams, wherein each of the plurality of video segments is transmitted on the assigned multicast stream.

Example Embodiments

In many instances, content providers can provide multiple Adaptive Bitrate (ABR) streams for a single broadcast channel. Generally speaking, multiple different ABR streams (e.g., at varying bitrates) can be provided for a plurality of broadcast channels, and client devices can be configured with logic to select one of the ABR streams that is optimal for the given client device. That is, it is generally preferable for a client device to display the highest quality video stream possible, and since network resources and processing capabilities can vary greatly between client devices, the optimal video stream can vary greatly between client devices. As an example, a very high bitrate encoding may be optimal for a dedicated streaming device on a high-speed network, while a relatively lower bitrate encoding may be optimal for a mobile device on a mobile network. As such, by providing multiple encodings at varying bitrates for a broadcast channel, content providers can better ensure that client devices can retrieve a stream that is close to optimal for the particular client device.

Many video clients are configured with logic to dynamically select between a plurality of video streaming profiles for a given instance of video content. For example, a content distribution network (CDN) could provide a plurality of different video streaming profiles for the instance of video content, with the profiles corresponding to a respective instance of the video content encoded in a respective bitrate. Generally, such video clients monitor the rate at which they receive segments of video data and to select the video streaming profile accordingly. For example, upon determining that video data is not being received soon enough, the client devices could select a lower bitrate profile to help prevent buffer underrun and pausing of the streaming video. As another example, when the client determines that the video data is being received sufficiently early, the client could request a higher bitrate profile to improve the quality of the video streaming experience.

Generally, multicast ABR solutions have a sender device that extracts data for an available ABR profile from a source and transmits the data for the ABR profile to subscribers. For example, an ABR profile can correspond to a respective bitrate encoding of video content. Generally, a client can request data for a video stream by specifying identifying information for the video stream (e.g., using a unique identifier corresponding to the video stream) and an ABR profile for the video stream that is to be used. In a multicast ABR solution, a client can subscribe to a multicast group corresponding to the particular video stream and ABR profile that the client wishes to receive data for.

As the ABR profile in such an example is selected by the client device, a network device (e.g., a network device managed by an Internet Service Provider (ISP) that processes requests for a substantial number of home networks and client devices) can be requested to subscribe to a significant number of multicast streams for ABR profiles of various video streams from an upstream network device. Likewise, the upstream network device will subscribe to the multicast streams as well, and so on until the content is received directly from the source. Even within a given network, various client devices may request different ABR profiles (e.g., a set-top box device may request a highest quality ABR profile, while a mobile device with a weaker Wi-Fi® connection may request a lower quality ABR profile due to the perceived lack of bandwidth). Thus, even within the same local network, different client devices may request different ABR profiles, further increasing the number of multicast groups that an upstream network device may subscribe to.

Generally, when a video player on a client device downloads a segment, the video player can determine that the download of the segment (which is of known size and duration) will complete sufficiently early by measuring the bitrate during the time the segment is being downloaded. As such, the video player will remain on the current ABR profile. When downloading a subsequent segment where the bitrate is lower, but still sufficient for the player to determine that the segment will be downloaded soon enough, the video player can choose to remain on the current ABR profile. At some point, where the video player determines that the download of a segment will exceed the time that it would take to consume the segment (risking a decoder under-run), the video player can take corrective action, abandoning the download of the segment at that bitrate and opting to download a lower bitrate version of the segment. While downloading the lower bitrate segment, the video player can again check whether the time to download the segment at the then available bitrate is sufficient once again. The video player could continue to download lower bitrate segment, upon determining that such downloads will complete sufficiently quickly to be played back on schedule, but the downloads are not occurring quickly enough to warrant attempting to download the segments at a higher bitrate ABR profile. If the video player subsequently determines that there is sufficient speed to abandon the download of the lower bitrate segment and attempt to download the high bitrate segment, the video player can then request segments for the higher bitrate BR profile.

Figure 1:
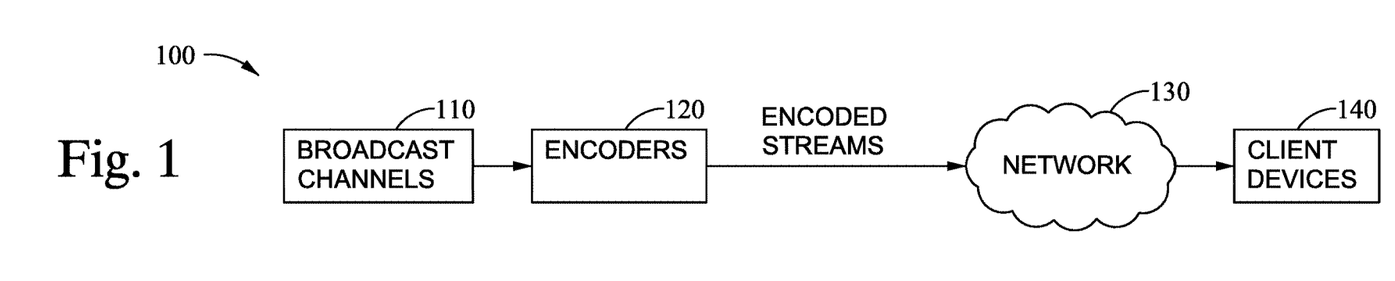
FIG. 1 illustrates a system for delivering encoded video streams to client devices configured with an Adaptive Bitrate (ABR) profile selection component, according to one embodiment described herein.

FIG. 1 illustrates a system for delivering encoded video streams to client devices, according to one embodiment described herein. As shown, the system 100 includes a plurality of broadcast channels 110, a plurality of encoders 120, a network 130 and a plurality of client devices 140. Generally, a master video stream is provided for at least one of the broadcast channels 110. Such a master video stream is typically a high-resolution video stream containing video content for the corresponding broadcast channel. The encoders 120 can then process the master video streams for the broadcast channels 110 to produce encoded ABR video streams. For example, three of the encoders 120 could be assigned to a particular one of the broadcast channels 110, and the three encoders could be configured to transcode the master video stream for the broadcast channel at different bitrates. As an example, the three encoders could be configured to encode the master video stream for the broadcast channel at a relatively high bitrate, a relatively moderate bitrate and a relatively low bitrate.

The encoded streams could then be transmitted to the client devices 140 using the network 130. In doing so, the content provider could generate a manifest file specifying that the particular broadcast channel is available in the three different bitrates, and could transmit such a manifest file to the client devices 140 using the network 130. The client devices 140 could be configured to process the manifest file and to determine which of the available bitrates is optimal for the particular client device. For example, a mobile client device could be configured to select the relatively low bitrate encoding, while a dedicated video streaming device on a high-speed network connection could be configured to select the relatively high bitrate encoding. Depending on the performance of the streaming of the selected encoding, the client devices could then dynamically adjust their selected encoding. Continuing the above example, if the mobile client device determines that segments for the video stream are arriving well in advance of their playback time, the mobile client device could request to begin receiving data from the moderate bitrate encoding stream. As another example, if the dedicated streaming client device determines that data is not arriving as quickly as expected and that buffer underrun is likely to occur, the dedicated streaming client device could request to begin receiving segments from the moderate bitrate encoding stream.

According to one embodiment described herein, a network device within the network 130 can be configured to manage streaming video profile selections of downstream client devices 140. For example, such a network device could be configured with a video streaming management component, that is configured to receive multicast network communications for a first video streaming profile of a plurality of video streaming profiles, for a video content item. Generally, the plurality of video streaming profiles can correspond to video content encoded in a distinct manner (e.g., at a distinct bitrate). Such a network device can be subscribed to multicast communications from an upstream network device within the network 130, for a video stream corresponding to the first video streaming profile. Such a subscription can be semi-permanent (e.g., when the system is operating properly, multicast data corresponding to the video stream will be transmitted to the network device), for example for broadcast channel implementations, or can be dynamic (e.g., responsive to an occurrence of a particular event).

Figure 2:
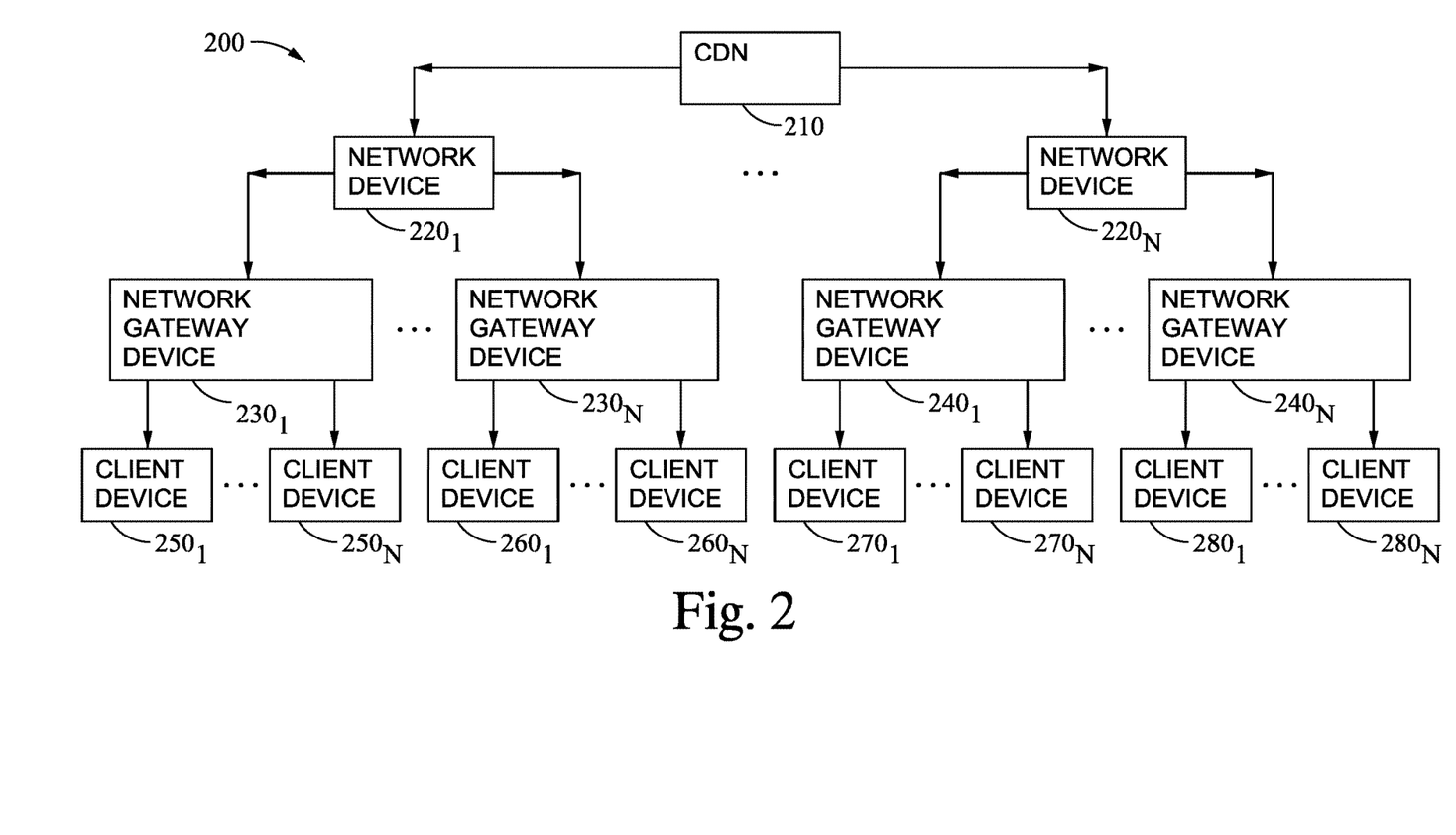
FIG. 2 illustrates a network topology for delivering encoded video streams to client devices, according to one embodiment described herein.

Generally, the encoded video streams generated by the encoders 120 can be transmitted to the client devices 140 using the network 130 in of different ways. One such way is through multicast communications, where encoded video streams are transmitted to the subscribing network devices within the network. FIG. 2 illustrates a network topology for delivering encoded video streams to client devices, according to one embodiment described herein. As shown, the network topology 200 includes a CDN 210, network devices $220_{1-N}$, network gateway devices $230_{1-N}$ and $240_{1-N}$, and client devices $250_{1-N}$, $260_{1-N}$, $270_{1-N}$, and $280_{1-N}$. In the depicted example, the network gateway devices $230_{1-N}$ and $240_{1-N}$ are configured to also serve as a router for a home network. Thus, for example, the client set-top box $240_1$ is configured to act as a router for the client device $270_{1-N}$.

In the depicted example, if the client device $270_1$ requests a particular encoded video stream for a particular broadcast channel, the client set-top box $240_1$ can be configured to subscribe to multicast transmissions from the network device $220_N$ for the particular encoded video stream. In turn, the network device $220_N$ can subscribe to multicast transmissions from the CDN 210 for the particular encoded video stream. One advantage to such an embodiment is that the segments for the particular encoded video stream can more easily be delivered to additional devices within the network topology 200 without the need for additional transmission and bandwidth. For example, if the client device $270_N$ also requests the particular encoded video stream for the particular broadcast channel, the client set-top box $240_1$ can simply provide the client device $270_N$ with the segments for the particular encoded video stream already being received due to the client device $270_1$'s request. In other words, the particular encoded video stream can be provided to the client device $270_N$ without creating an additional network connection with the CDN 210, thereby reducing the workload on the CDN 210, the network device $220_N$ and the client set-top box $240_1$.m In some instances, the network gateway devices $230_{1-N}$ and $240_{1-N}$ are configured to subscribe to multicast transmissions for at least one video stream for the broadcast channels 110. In turn, the network devices $220_{1-N}$ can subscribe to multicast transmissions for the at least one video stream for the broadcast channels 110. While such an embodiment creates a constant flow of network traffic between the CDN 210 and the network devices $220_{1-N}$, and between the network devices $220_{1-N}$ and the network gateway devices $230_{1-N}$ and $240_{1-N}$, it enables any of the client devices $250_{1-N}$, $260_{1-N}$, $270_{1-N}$, and $280_{1-N}$ to retrieve segments for the requested video streams from the corresponding client set-top box, using a local (and much faster) network connection. Moreover, regardless of the number of client devices $250_{1-N}$, $260_{1-N}$, $270_{1-N}$, and $280_{1-N}$, the workload on the CDN 210 remains constant, unlike conventional solutions where the client devices are configured to establish a separate network connections with the CDN 210 for streaming video content. As such, by transmitting the video streams through multicast transmission techniques, embodiments provide a more scalable video streaming solution relative to conventional techniques.

Figure 3:
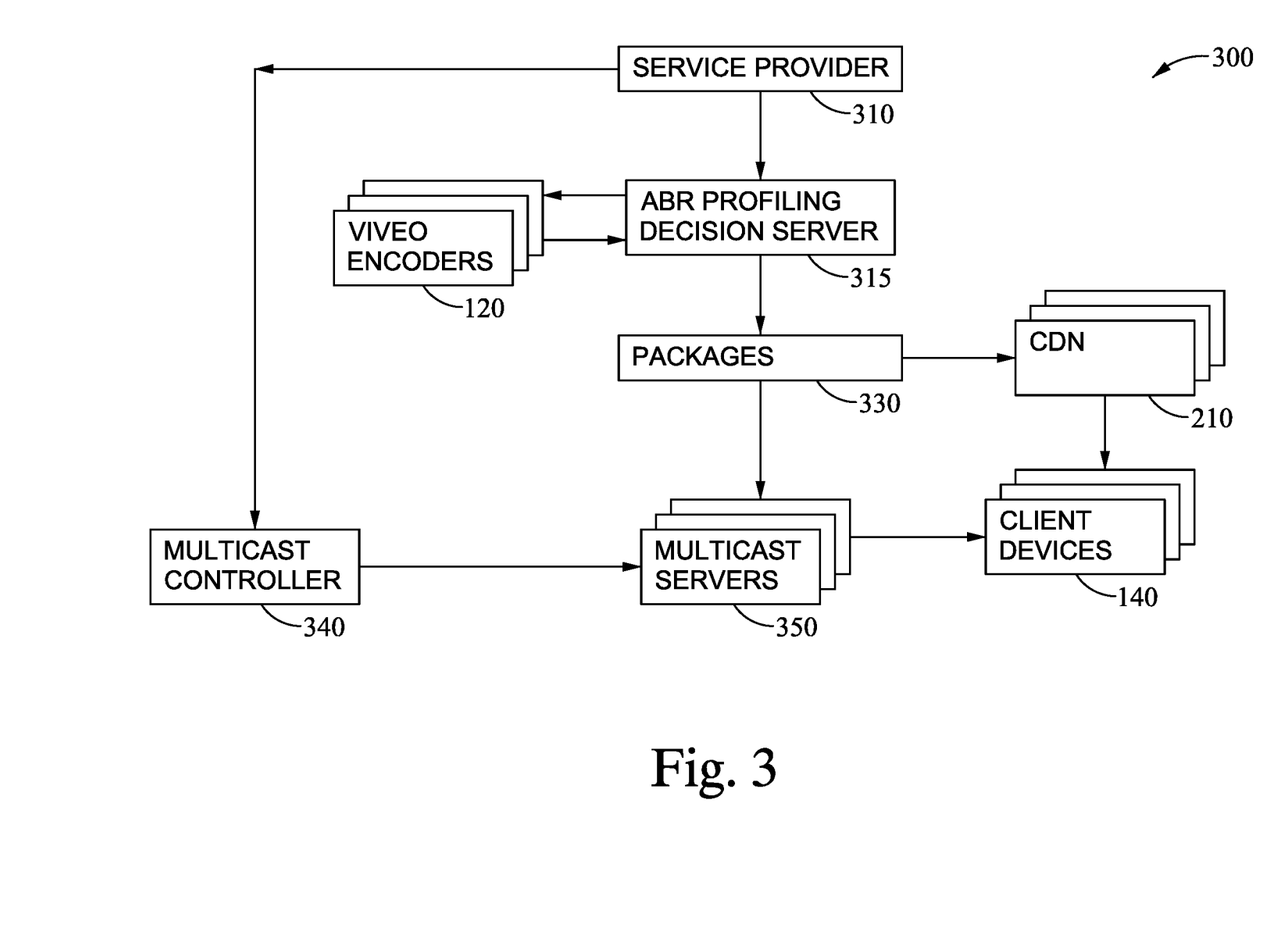
FIG. 3 illustrates a network topology for delivering encoded video streams to client devices, according to one embodiment described herein.

FIG. 3 illustrates a network topology for delivering encoded video streams to client devices, according to one embodiment described herein. As shown, the system 300 includes a service provide 310, an ABR profile decision server 315, a plurality of video encoders 120, packagers 330, CDNs 210, client devices 140, a multicast controller 340 and multicast servers 350. Generally, the ABR profile decision server 315 is configured to determine an optimal allocation of the video encoders 120 to various broadcast channels, in order to optimally deliver ABR streams to the client devices 140.

The video encoders 120 can then encode the master streams for their assigned broadcast channel to produce the ABR streams at their respective assigned bitrate. The encoded streams can then be processed by the packagers 330, which can provide the encoded ABR content to the CDN 210 and the multicast servers 350 for delivery to the client devices 140. Additionally, the packagers 330 can provide client consumption information back to the ABR profile decision server 315, for use in refining the allocation of the video encoders 120 to the broadcast channels. In the depicted embodiment, the CDNs 210 can be configured to deliver the encoded ABR streams to particular client devices 140 using unicast transmissions, while the multicast servers 350 can be configured to deliver the encoded ABR streams to other client devices 140 using multicast transmissions.

As discussed herein, multicast ABR streaming is a method for efficiently distributing ABR video content in environments where there is insufficient capacity to use unicast and where there are many HTTP adaptive streaming (HAS) clients viewing the same content concurrently. Live sporting events and royal weddings are examples of the kind of content that may benefit from multicast ABR streaming techniques. According to one embodiment, the multicast receiver functionality is built into an IP gateway and acts as a transparent proxy for HAS clients behind that gateway. The proxy function sets a timer and allows the first few requests from a HAS client to be served via unicast. Once the timer expires, the proxy will determine whether the HAS client has settled on a particular profile. Assuming a profile has been determined, the proxy will issue an IGMP join for a multicast carrying that profile. One problem in conventional solutions is that there is no coordination between the framing of the multicast distribution of the various segments and the IGMP join being issued. As a consequence, it is very likely that some of the data sent over multicast will be unusable as it will not be aligned to the start of a segment. In an environment where capacity is not reserved for multicast and/or the overall link capacity varies, these wasted bits can be problematic as the presence of the multicast will impinge on concurrent ABR flows. This in turn can affect the HAS client that ideally will benefit from the multicast distribution, as the HAS client may observe a drop in throughput due to the restricted capacity and shift down to a lower bitrate ABR profile, thereby shifting away from the multicast profile that has begun to flow.

Furthermore, if the application level is going to manage the use of multicast then control over the timing of IGMP leave messages is also important. Consider a case that there are two multicast flows occupying a constrained link, and the user wishes to start a third multicast flow but there is insufficient capacity to sustain the third multicast flow. In this scenario, typical unicast behavior would be to fair share the link and for the flows to share the bandwidth equally but the multicast behavior skews bandwidth usage towards the two multicasts and the new flow will get the small share which will in turn equate to lower quality. As such, the application may wish to manage this behavior by leaving the multicasts and allowing the three flows to run over unicast. If the IGMP leave is not issued at a segment boundary, there will be some amount of wastage which will result in undesirable behavior during the transition from multicast to unicast. Ideally, the application can issue the leave request to guarantee a clean transition.

Figure 4:
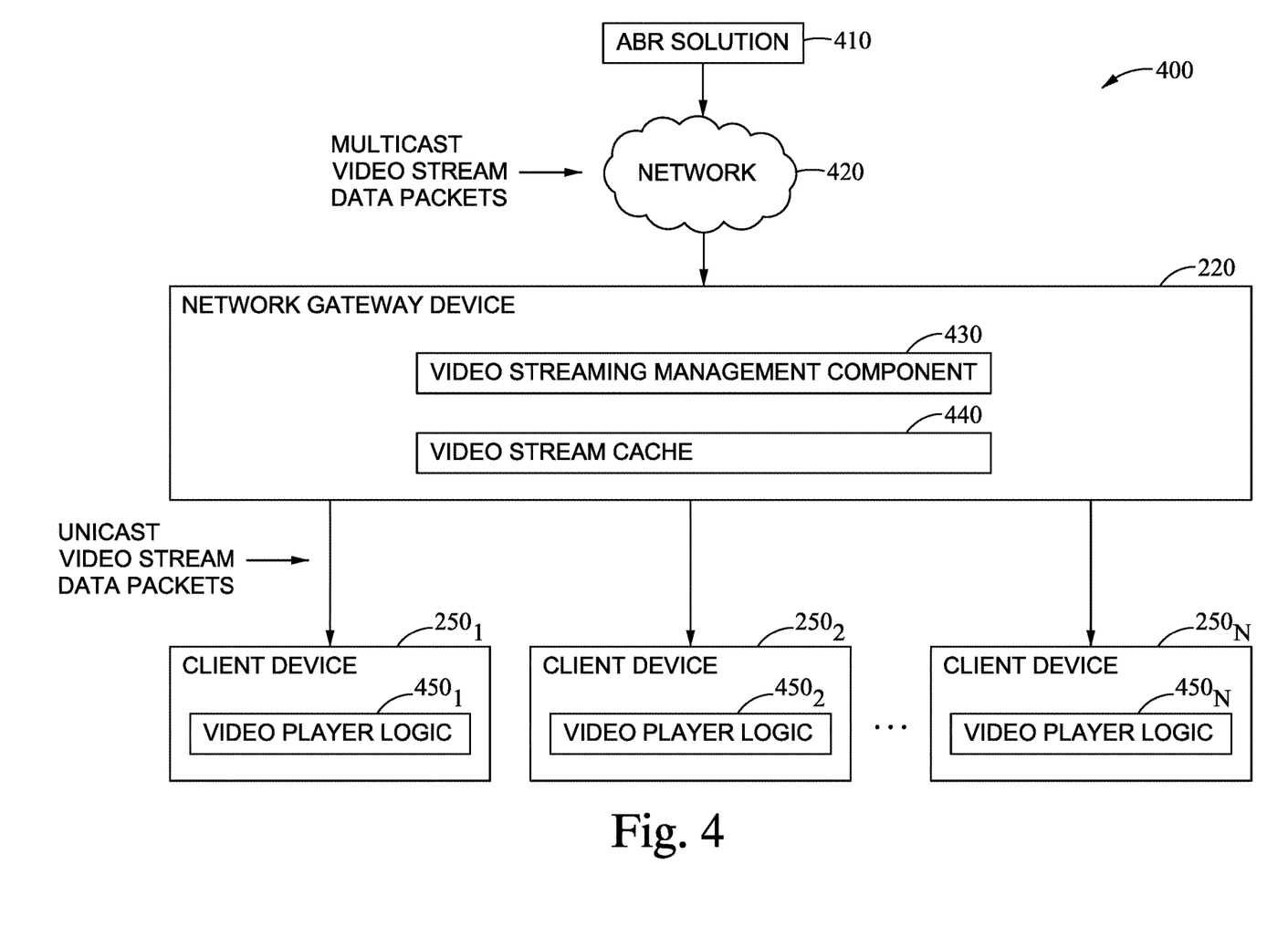
FIG. 4 illustrates an environment for streaming ABR video content using network communications, according to one embodiment described herein.

Generally, attempting to schedule an IGMP request with segment accuracy is very challenging for a single multicast group due to the precise timing of request (and the router reacting). Pragmatically speaking, IGMP joins/leaves are not instantaneous and there can be between 10 s and 100 s of milliseconds of delay before they take effect. An exemplary streaming environment is shown in FIG. 4, which illustrates an environment for streaming ABR video content using multicast network communications, according to one embodiment described herein. As shown, the environment 400 includes an ABR solution 410, a network 420, network gateway device 220, and client devices 250(1)-(N). The network gateway device 220 includes a video streaming management component 430. The client devices 250(1)-(N) contain respective video player logic 450(1)-(N). Generally, the video player logic 450(1)-(N) represents computer logic (e.g., software and/or hardware) that is configured to decode and playback video stream data.

The video streaming management component 430 is configured to request the multicast video stream segments from the ABR solution 410, by transmitting one or more IGMP request messages to the ABR solution 410 to subscribe to one or more multicast channels for an instance of video content. The video streamlining management component 430 can store the received multicast video stream segments in a video stream cache. The data in the video stream cache 440 can then be used to service unicast video stream requests from the client devices 250(1)-(N). For example, the video player logic 450(1)-(N) may be configured to always request data from the ABR solution 410 using unicast network communications. However, where the video player logic 450(1)-(N) are requesting data for the same instance of video content (e.g., a live sporting event), it would be highly inefficient to allow the video player logic 450(1)-(N) to establish a separate unicast connection with the ABR solution 410, thereby retrieving redundant copies of the video segments for the instance of video content (i.e., a separate copy for the instances of video player logic 450(1)-(N)). As such, the video streaming management component 430 could be configured to determine when two or more of the client devices 250(1)-(N) are requesting data for the same instance of video content, and to subscribe to multicast communications for the instance of video content, rather than processing separate unicast requests for the instance of video content. The video streaming management component 430 can then return video data for instance of video content from the video stream cache 440, to fulfill the unicast requests for the video player logic 450(1)-(N).

In many instances, conventional systems inefficiently initiate multicast communications for a given instance of video content by subscribing to multicast communications during the transmission of a particular segment, resulting in wasted network traffic being sent through the network 420 (e.g., the data for the partial segment). These inefficiencies can be particularly problematic when the network gateway device 220 has an already constrained network link to the network 420. In one embodiment, the ABR solution 410 can allocate a plurality of multicast groups for a variant of streaming video content (e.g., a broadcast channel, a live sporting event, etc. at a specific bit rate) and the video streaming management component 430 can issue IGMP join requests for multicast groups, such that no wasted data is received (e.g., when at least one of the instances of video player logic 450(1)-(N) is already receiving video data for the instance of streaming video content over unicast communications).

For example, the video segments for the instance of streaming video content can be assigned between two multicast streams. In one embodiment, alternating segments of video data are assigned to the multicast streams, e.g., segment 1 to multicast stream 1, segment 2 to multicast stream 2, segment 3 to multicast stream 1, segment 4 to multicast stream 2, etc. In a particular embodiment, alternating groups of two or more segments of video data are assigned to the multicast streams. According to one embodiment, each segment of video data is assigned to one of the multicast streams.

Generally, the video streaming management component 430 can be aware which group will be active at a given time. For example, the ABR solution 410 can periodically update the manifest file for the instance of streaming video data, such that the manifest file indicates which of the multicast streams is assigned the current video segment and which multicast stream is assigned the next video segment. Moreover, the manifest file can further indicate an expected time at which the playback of the next video segment will begin. The video streaming management component 430 can use such data within the manifest file to determine which multicast group is currently active at a given time, as well as which multicast group is assigned the next segment of video data.

The video streaming management component 430 can then issue a first join request for the currently inactive multicast group. Of note, the video streaming management component 430 can refrain from subscribing to the currently active multicast group at this time. In an embodiment where a client device 250(1)-(N) is already receiving data for the currently active segment of video data over unicast communications, receiving a duplicate copy of a portion of the currently active segment over the currently active multicast group would simply resulted in wasted data passing through the network 420. Moreover, as an incomplete video segment may be unsuitable for playback, such data may be wasted even when no client device 250(1)-(N) is currently receiving the data over unicast communications.

The video streaming management component 430 could then determine when the currently inactive multicast group becomes active (e.g., when the video streaming management component 430 begins receiving data on the subscribed multicast channel, at the estimated time in the manifest file, etc.). In response, the video streaming management component 430 can issue the IGMP join request for the previously active multicast channel. Of note, in an embodiment where each segment of the instance of video content is assigned to one of the multicast channels, the video streaming management component 430 will receive all of the video segments for the instance of video content across all of the multicast groups, without receiving any duplicate data for any of the video segments.

Additionally, in situations where the video streaming management component 430 wishes to manage a transition from multicast communications to unicast communications (e.g. to facilitate fair-sharing of the available capacity), the video streaming management component 430 can stagger the IGMP leave requests so that a complete segment is acquired before the transition occurs. To do this, the video streaming management component 430 can issue an IGMP leave request for the currently inactive multicast group, and the video streaming management component 430 can then issue the IGMP leave for the currently active multicast group when the currently active multicast group transitions to inactive.

In order to signal which segments are delivered over which group, the multicast enabled data plane for the ABR solution 410 can populate the manifest file/playlist with the active multicast group addresses. For example, in a HTTP Live Streaming (HLS) media playlist, the multicast group address can be specified as a proprietary tag. The video streaming management component 430 can inspect the manifest file/playlist to determine which multicast group will next be active. The video streaming management component 430 can then issue an IGMP join for the multicast group the video streaming management component 430 expects to next be active (i.e., the multicast group that will be sending the next video segment). This expectation can be assessed by including a timestamp that specifies the expected start time of the next group. In one embodiment, this timestamp could be the predicted earliest time at which this flow would begin. More generally, any suitable timing mechanism for streaming video data can be used, consistent with the functionality described herein. This tag can be stripped during the usual playlist manipulation function in a multicast RX component (or can be left within the data).

An example is shown below as Example 1.

```
Playlist @ 2017-05-26T12:59:56
#EXTM3U
... other segments ...
#EXTINF:4.0,
segment3.ts
#EXTINF:4.0,
segment4.ts
#EXT-X-M-ABR-GROUPS:
CURRENT="239.0.0.1",NEXT="239.0.0.2",
NEXT-START="2017-05-26T13:00:00"
```

Example 1

For a video streaming management component 430 that is starting a multicast flow at this point, the video streaming management component 430 would join the multicast group 239.0.0.2 to ensure the multicast RX receives segment5.ts. At the point that data begins to flow on the multicast group 239.0.0.2, the video streaming management component 430 could issue an IGMP join request for the multicast group 239.0.0.1 to ensure that the video streaming management component 430 is ready to receive data on the 239.0.0.1 group as well. 4 seconds later, that playlist could update to the playlist shown below as Example 2.

```
Playlist @ 2017-05-26T13:00:00
#EXTM3U
. . . other segments . . .
#EXTINF:4.0,
segment4.ts
#EXTINF:4.0,
segment5.ts
#EXT-X-M-ABR-
GROUPS:CURRENT="239.0.0.2",
NEXT="239.0.0.1",
NEXT-START="2017-05-26T13:00:04
```

Example 2

As shown, the current and next multicast groups have now swapped (i.e. segment6.ts will be delivered on 239.0.0.1). Using the same examples, the video streaming management component 430 that is trying to cleanly leave the channel between 12:59:56 and 13:00:00 would issue an IGMP leave for 239.0.0.2, then at or after 13:00:00, the video streaming management component 430 could issue a leave for 239.0.0.1.

Figure 5:
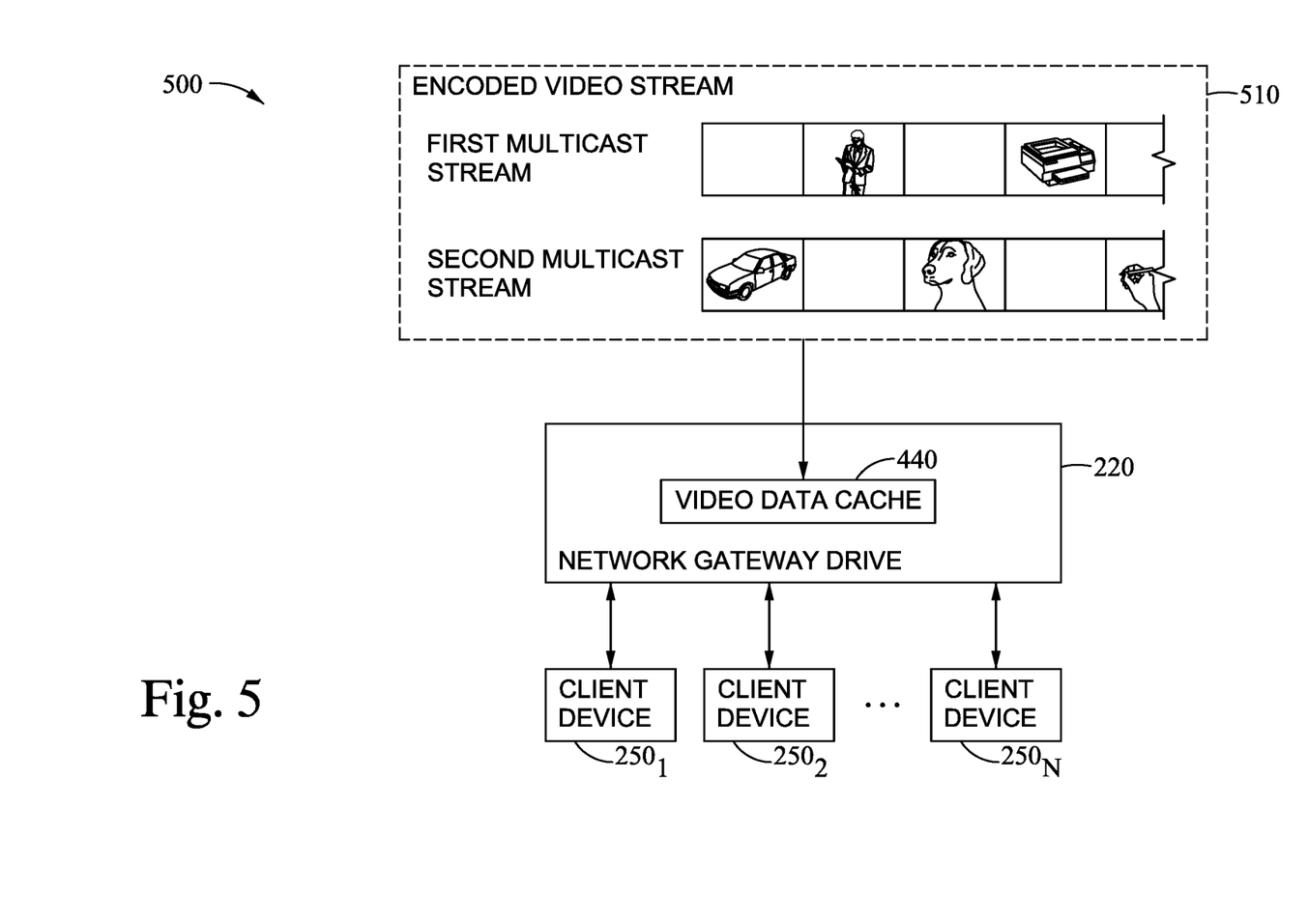
FIG. 5 illustrates an environment for streaming an instance of ABR video content stream variant split into multiple, anti-phase, multicast streams, according to one embodiment described herein.

An example will now be discussed with regard to FIG. 5, which illustrates an environment for streaming an instance of ABR video content using multiple multicast streams, according to one embodiment described herein. As shown, the system 500 includes an encoded video stream variant 510, the network device 220 and client devices 250(1)-(N). In the depicted embodiment, the video streaming management component 430 on the network gateway device 220 has subscribed to multicast communications for the first multicast stream and the second multicast stream.

Figure 6:
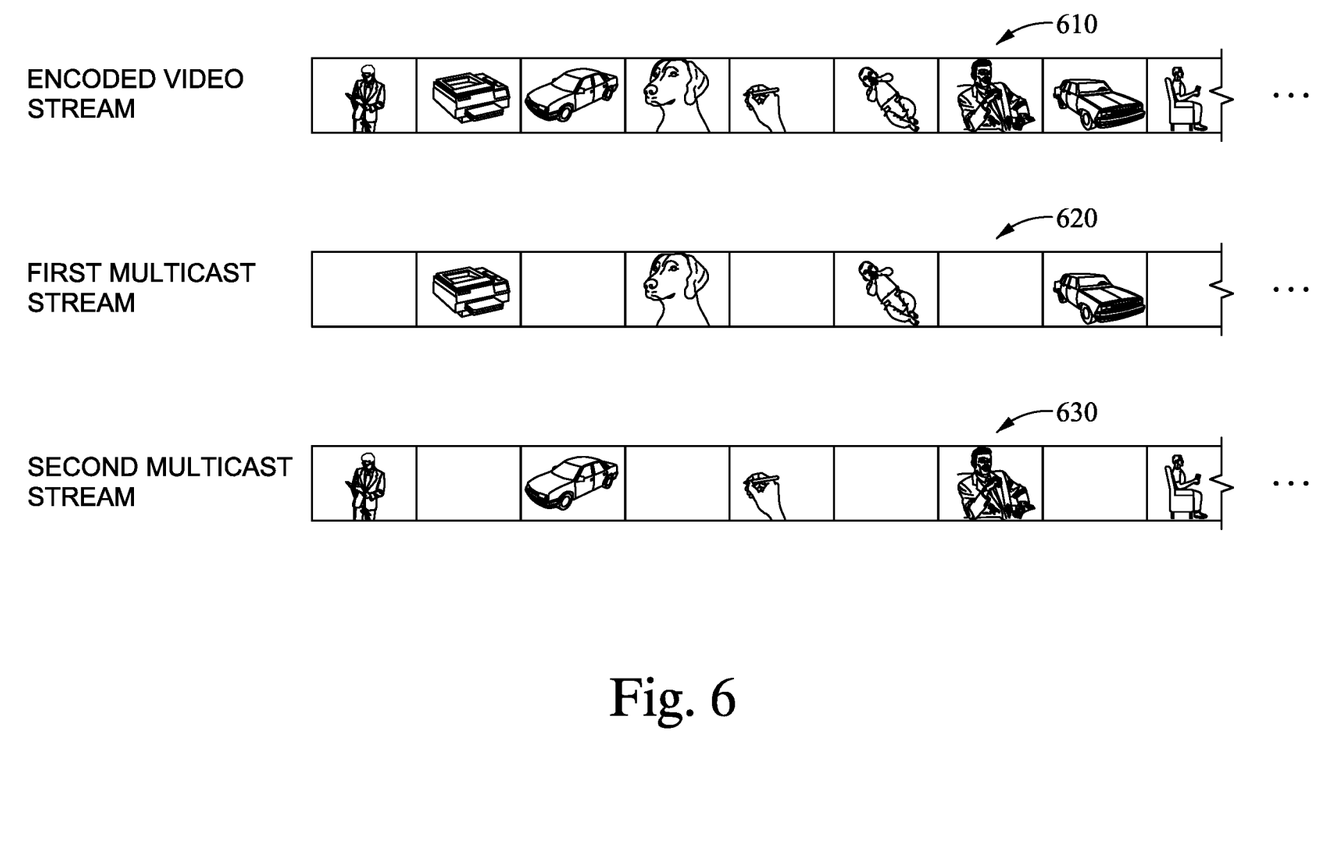
FIG. 6 is a block diagram illustrating an encoded video stream having segments assigned to multiple multicast streams, according to one embodiment described herein.

As shown, the first segment of the video stream variant 510 has been assigned to the second multicast stream, the second segment has been assigned to the first multicast stream, the third segment has been assigned to the second multicast stream, and so on. Such an assignment scheme is shown in FIG. 6, which is a block diagram illustrating an encoded video stream variant having segments assigned anti-phase into multiple multicast streams, according to one embodiment described herein. As shown, the segments within the encoded video stream variant 610 have been assigned to the first and second multicast streams 620 and 630, such that every segment within the encoded video 610 is assigned to one of the multicast streams 620 and 630. In one embodiment, the video streaming management component 430 can store the received video segments in the video data cache 440, which can then be transmitted to the client devices 250(1)-(N) for playback. However, such an example is provided for illustrative purposes only and without limitation. More generally, the techniques used herein can be used by a variety of different devices, including directly by a client device 250(1)-(N).

Figure 7A:
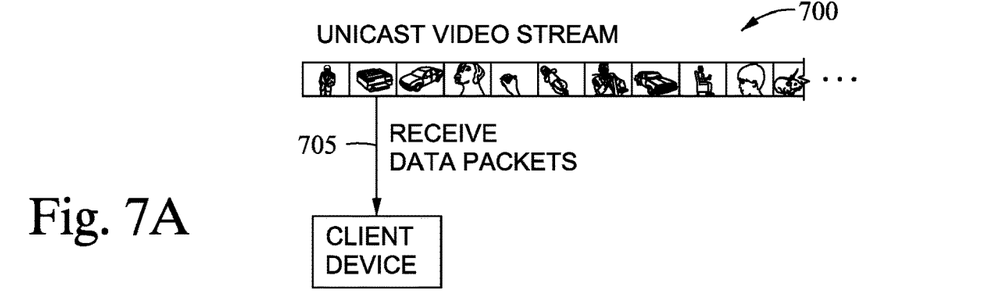
FIGS. 7A-C are block diagrams illustrating a client device transitioning from a unicast video stream to multiple multicast streams for an instance of video streaming content, according to one embodiment described herein.

As discussed above, the video streaming management component 430 can manage join requests to the multicast streams 620 and 630, in a manner that avoids receiving wasted bits of data. An example of such a process will now be discussed with regard to FIGS. 7A-C, which are block diagrams illustrating a client device transitioning from a unicast video stream to multiple multicast streams for an instance of video streaming content, according to one embodiment described herein. As shown, FIG. 7A illustrates a diagram 700 depicting a first moment in time where a client device is receiving segments 705 for an instance of streaming video content over unicast data communications.

At a subsequent moment in time, the video streaming management component 430 determines to transition from unicast data communications to multicast data communications for streaming a given variant of video content. While the depicted example illustrates a transition from unicast to multicast communications, in other embodiments, the video streaming management component 430 could determine to begin streaming the video content using multicast data communications, without first using unicast communications. In any event, the video streaming management component 430 can determine that a first multicast group of a plurality of multicast groups for the first instance of streaming video content is currently active. For example, the video streaming management component 430 could parse a manifest/playlist file for instance of video content and could retrieve data values specified in a proprietary tag within the manifest. The video streaming management component 430 could then determine, from the retrieved data values, which multicast group is currently active and which multicast group will be active next.

Figure 7B:
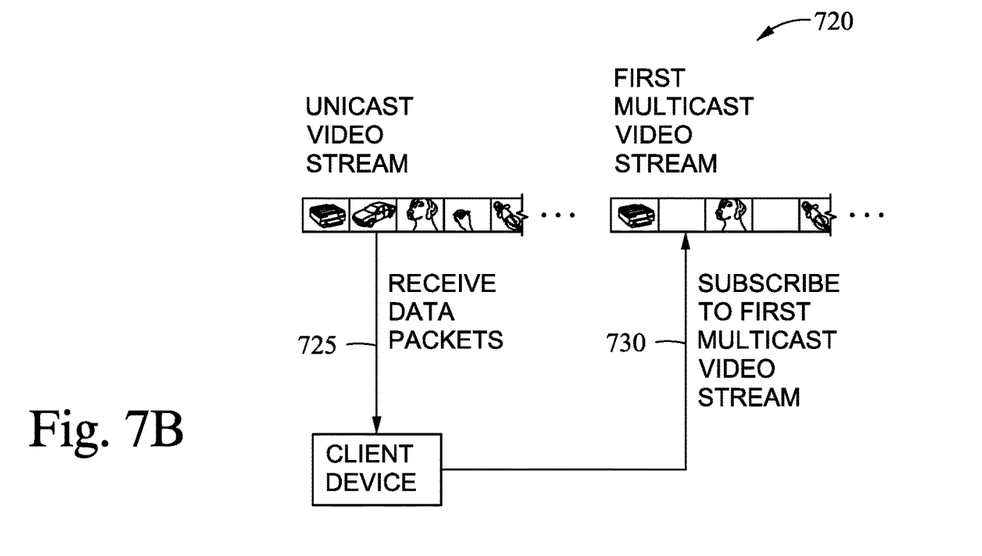

In the depicted example 720 shown in FIG. 7B, the video streaming management component 430 has determined that the first multicast video stream is currently inactive but will be the next active multicast stream. As such, while receiving data from the unicast video stream 725, the video streaming management component 430 transmits an IGMP join message to subscribe to the first multicast video stream 730. For example, the video streaming management component 430 could transmit the IGMP join message to an upstream network device (e.g., an Internet Service Provider network device), requesting to subscribe to future datagrams for the first multicast group. As shown, the client device subscribes to the first multicast video stream at a point in time when the first multicast video stream is inactive, as shown by the unshaded box on the depiction of the first multicast video stream 720. As such, the client device will not receive data from the first multicast group until the first multicast group becomes active again (as shown by the shaded box in the depiction of the first multicast video stream). As a result, and unlike conventional solutions, the client device will receive complete video segments on the first multicast group, and will not receive any incomplete video segments that would be discarded. In other words, embodiments provide a technical solution that reduces the network traffic used to deliver the video stream to the client device by eliminating wasteful data (i.e., incomplete video segments).

Figure 7C:
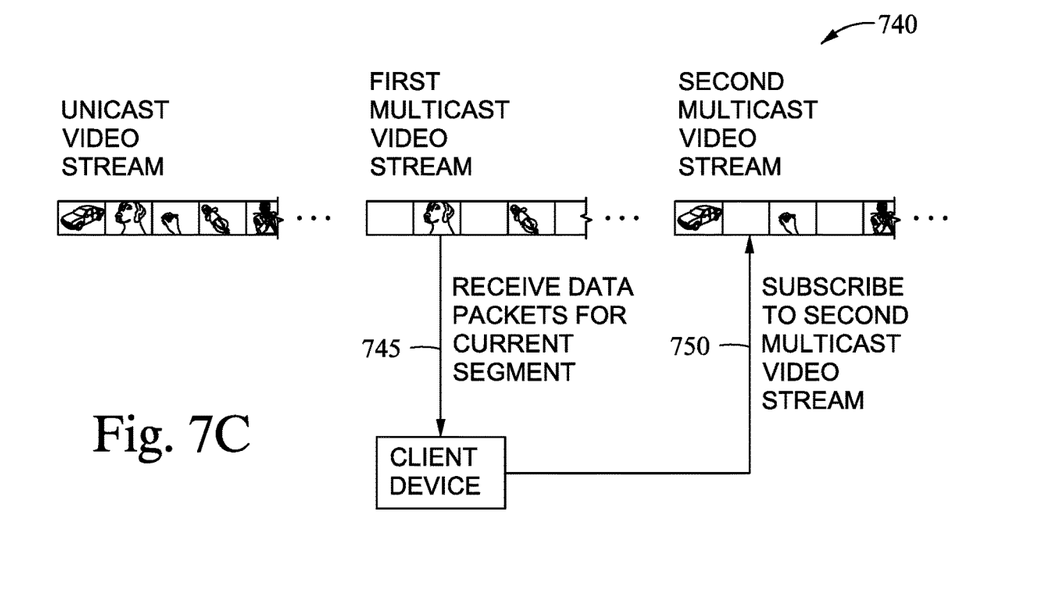

Subsequent to receiving the first segment of the first instance of streaming video content, the video streaming management component 430 can transmit an IGMP Join network message for a second multicast group of the plurality of multicast groups. An example 740 of this is shown in FIG. 7C, where the video streaming management component 430 transmits an IGMP join message to subscribe to the second multicast group 750, while receiving segments for the current video segment from the first multicast group 745. In the depicted example, the client device is shown as receiving data for the current segment 745 from the first multicast video stream, and subscribing to the second multicast group 750 at a point in time when no video content is being transmitted on the second multicast group (as shown by the unshaded box within the second multicast video stream in the depicted example 740). As the IGMP join message is transmitted at a point in time when no data is being sent on the second multicast group, the client device will not receive an incomplete segment of video data that would be discarded, as would be the case in conventional solutions.

Of note, in the depicted example where the video stream is divided across two multicast groups, the video streaming management component 430 will not request any subsequent segments using unicast communications, as segments of the video stream will be delivered across the two multicast groups. That is, the video segments can be divided across the multicast groups, e.g., with each segment of video data assigned to a single multicast group. Accordingly, for any given moment in time, a single multicast group will be active, in that a single multicast group will be transmitting the assigned segment. As such, while the total amount of network traffic used to transmit the video stream over multicast is substantially the same as when transmitting the video stream over unicast communications, embodiments described herein enable the video streaming management component 430 to begin and end multicast communications without receiving any duplicate video stream data, thereby reducing wasteful network traffic.

Figure 8:
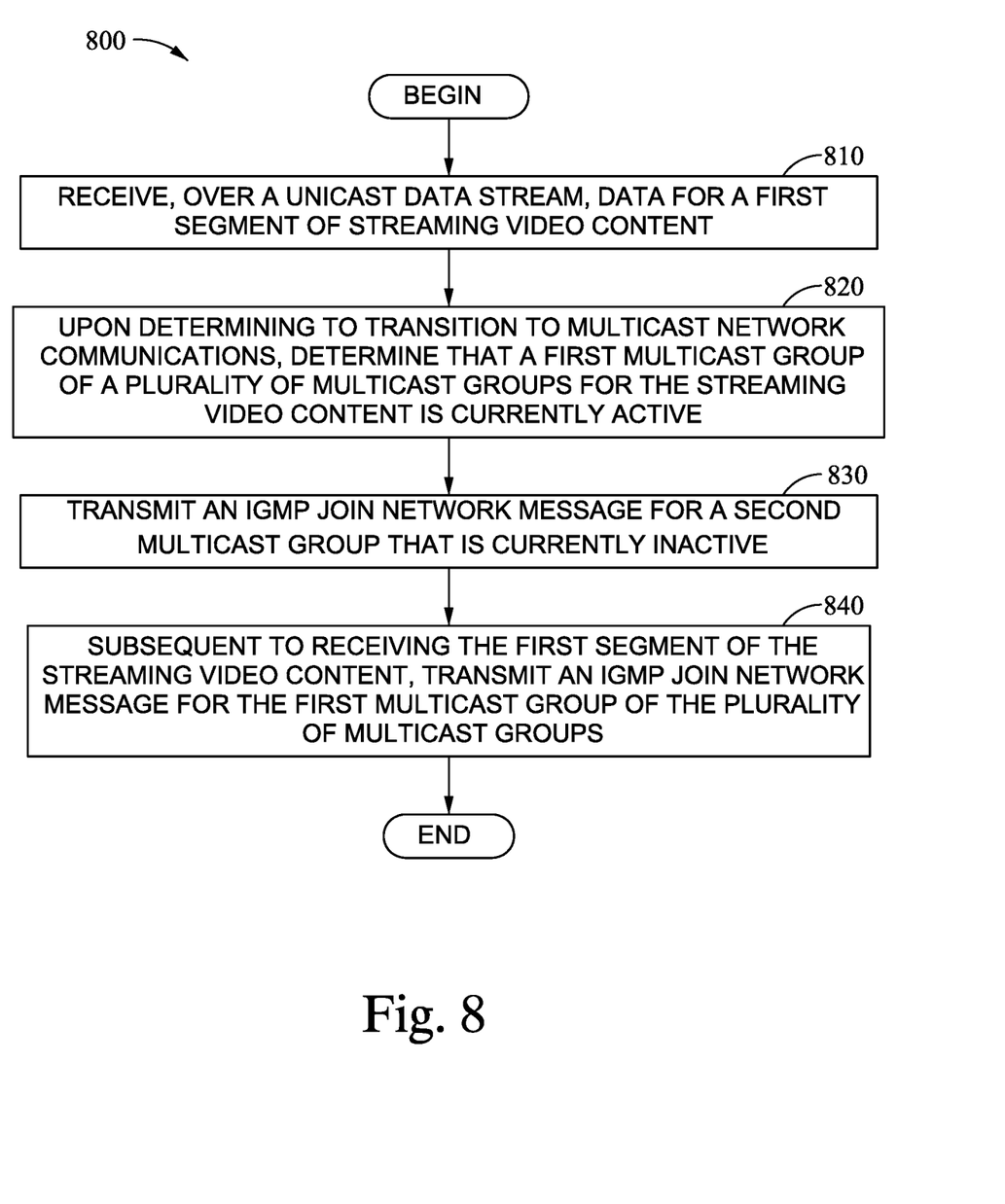
FIG. 8 is a flow diagram illustrating a method of joining multicast groups for streaming an instance of video content, according to one embodiment described herein.

FIG. 8 is a flow diagram illustrating a method of joining multicast groups for streaming an instance of video content, according to one embodiment described herein. As shown, the method 800 begins at block 810, where the video streaming management component 430 receives, over a unicast data stream, data for a first segment of streaming video content. Upon determining to transition to multicast network communications, the video streaming management component 430 determines that a first multicast group of a plurality of multicast groups for the streaming video content is currently active (block 820). As discussed above, the video streaming management component 430 can determine the first multicast group is currently active based on a proprietary tag specified within a manifest file for the instance of video content.

The video streaming management component 430 transmits an IGMP Join network message for a second multicast group that is currently inactive (block 830). For example, the video streaming management component 430 could determine that the second multicast group is currently inactive but is the multicast group that will next be active, based on the proprietary tag within the manifest file for the instance of video content. Advantageously, by subscribing to multicast communications for the multicast group before the group becomes active, the video streaming management component 430 can help ensure that no wasted data is transferred in subscribing to the multicast streams. Subsequent to receiving the first segment of streaming video content, the video streaming management component 430 transmits an IGMP Join network message for the first multicast group of the plurality of multicast groups (block 840), and the method 800 ends.

Figure 9:
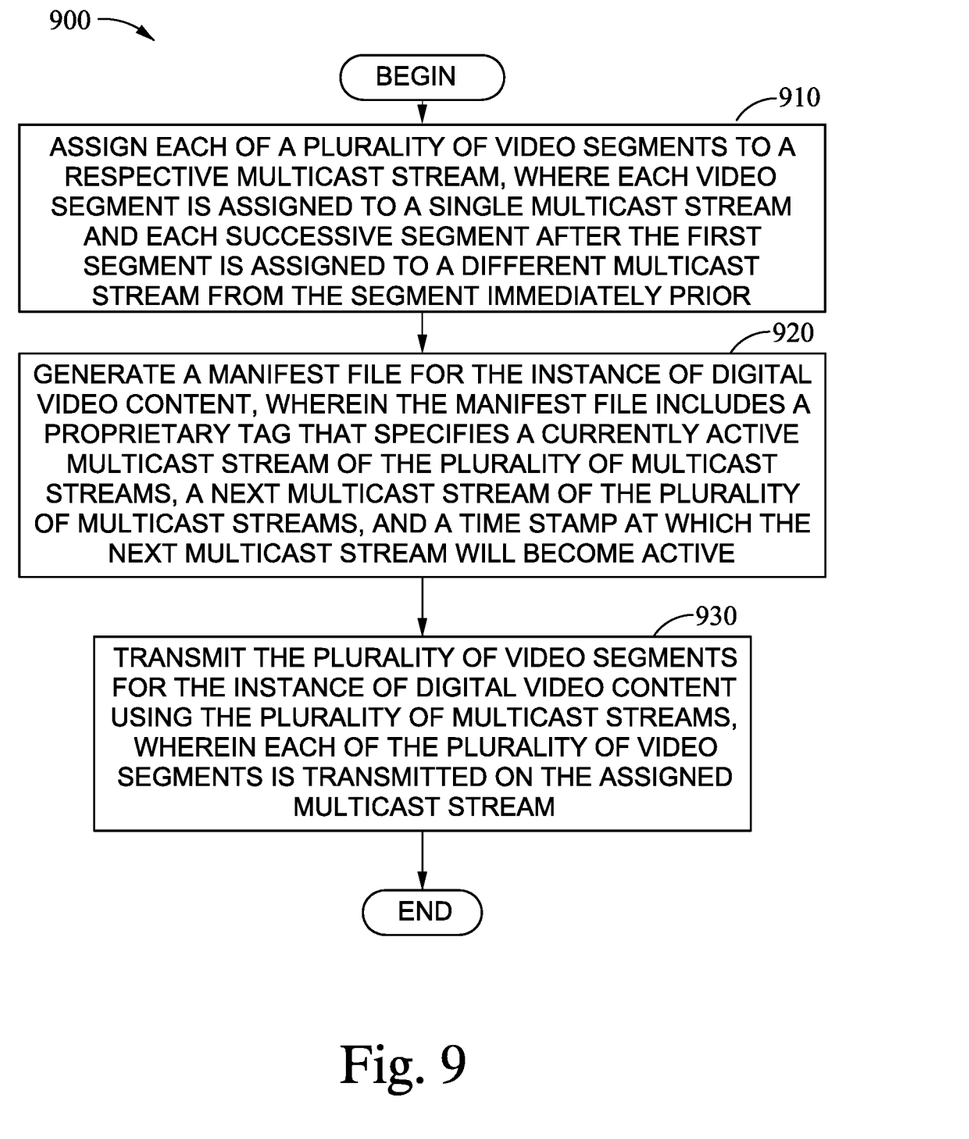
FIG. 9 is a flow diagram illustrating a method of providing multiple multicast streams for an instance of digital video content, according to one embodiment described herein.

FIG. 9 is a flow diagram illustrating a method of providing multiple multicast streams for an instance of digital video content, according to one embodiment described herein. As shown, the method 900 begins at block 910, where software logic for the ABR solution 410 assigns a plurality of video segments of an instance of video content a plurality of multicast streams, such that the video segments are assigned to a single multicast stream and such that successive segments after the first segment are assigned to a different multicast stream from the segment immediately prior. In one embodiment, the video segments are assigned in an alternating fashion to the multicast streams. In a particular embodiment, groups of video segments (e.g., groups of 2 segments) are assigned in the alternating fashion to the multicast streams. More generally, any technique for assigning segments to multicast streams can be used, consistent with the functionality described herein. Additionally, while examples are provided herein that describe the use of two multicast groups to transmit an instance of video content, one of ordinary skill in the art will recognize that, more generally, two or more multicast groups can be used, consistent with the functionality described herein.

The logic for the ABR solution 410 generates a manifest file for the instance of digital video content (block 920). In the depicted embodiment, the manifest file includes a proprietary tag that specifies a currently active multicast stream of the plurality of multicast streams, a next multicast stream of the plurality of multicast streams, and a time stamp at which the next multicast stream will become active. The logic for the ABR solution 410 transmits the plurality of video segments for the instance of digital video content using the plurality of multicast streams, wherein the plurality of video segments are transmitted on their respective assigned multicast stream (block 930), and the method 900 ends.

Figure 10:
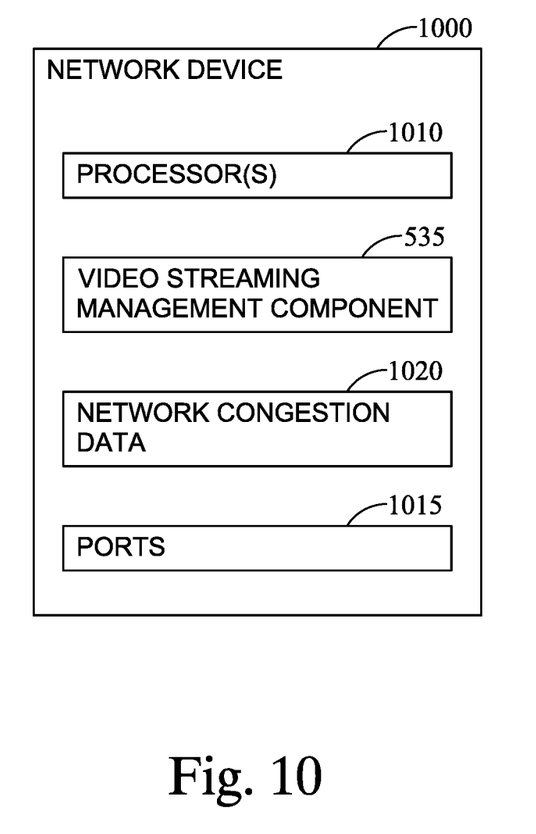
FIG. 10 is a block diagram illustrating a network device configured with a video streaming management component, according to one embodiment described herein.

FIG. 10 illustrates a network device configured with video streaming management logic, according to one embodiment described herein. As shown, the network device 1000 includes, without limitation, processors 1010, video streaming management logic (also referred to herein as video streaming management component 535), network congestion data 1020 and communication ports 1015. The processor 1010 may be any processing element capable of performing the functions described herein. The processor 1010 represents a single processor, multiple processors, a processor with multiple cores, and combinations thereof. The network congestion data 1020 may contained with a memory device (not shown), which may be either volatile or non-volatile memory and may include RAM, flash, cache, disk drives, and the like. The network device may also include a control plane for configuring and managing the forwarding logic.

Generally, the network congestion data 1020 represents data collected by the video streaming management component 535 that describes a network state of the network device 1000. For example, the network congestion data 1020 could specify a retransmission request rate of one of more downstream clients of the network device 1000. The video streaming management component 535 could receive multicast network communications for a first video streaming profile, of a plurality of video streaming profiles, for a video content item. For instance, the network device 100 could be subscribed to multicast communications from an upstream network device, for a video stream corresponding to the first video streaming profile. As an example, the video streaming management component 535 could subscribe to the multicast communications for the video stream, responsive to a request for the first video streaming profile from a downstream client device.

In one embodiment, the network device 1000 represents a client device (e.g., a dedicated set-top streaming box, a tablet device, a mobile device, etc.). The video streaming management component 535 could receive, from a video streaming solution, multicast User Datagram Protocol (UDP) datagrams for a plurality of video streams. Such multicast data could be transmitted across a first network during transmission from the video streaming solution, and the first network could be preconfigured to prioritize UDP data over TCP/IP data.

The video streaming management component 535 could determine when a first network congestion condition has been satisfied at the client device. For example, the first network congestion condition could be a rate of data loss for one of the plurality of video streams. In response to the first network congestion condition being satisfied, the video streaming management component 535 could select a first one of the plurality of video streams having a lower priority, relative to a second one of the plurality of video streams, and could request TCP/IP segments for the selected first video stream, rather than the multicast UDP segments for the first video stream. In one embodiment, the first video stream represents a stream being recorded on the client device when the first network congestion condition is determined to be satisfied at the client device, and wherein the second video stream represents a stream being viewed at the client device when the first network congestion condition is determined to be satisfied at the client device. In this way, the video streaming management component 535 can prioritize video streams that, if delayed, would affect the user's viewing experience. On the other hand, a greater amount of data loss and/or delay may be acceptable for a stream being recorded for later viewing, as lost or erroneous segments can be downloaded at a subsequent point in time but before the stream is viewed by a user.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
determining that a first multicast group of a plurality of multicast groups for streaming video content is currently active in response to determining to initiate multicast network communications for the streaming video content;
transmitting an Internet Group Management Protocol (IGMP) Join network message for a second multicast group of the plurality of multicast groups that is currently inactive; and
upon determining that the first multicast group is currently inactive, transmitting an IGMP Join network message for the first multicast group, wherein the streaming video content is divided across the plurality of multicast groups, such that each segment of the streaming video content is assigned to one of the plurality of multicast groups, and wherein each successive video segment after a first video segment is assigned to a different multicast group, relative to the video segment immediately prior.

2. The method of claim 1, wherein determining that a first multicast group of a plurality of multicast groups for the streaming video content is currently active further comprises:
parsing a manifest file for the streaming video content to determine the first multicast group is currently active.

3. The method of claim 2, further comprising:
parsing the manifest file for the streaming video content to determine the second multicast group and to determine a time at which the second multicast group will be active.

4. The method of claim 1, further comprising:
upon determining to transition from multicast network communications to unicast network communications:
determining a third multicast group of the plurality of multicast groups is currently active; and
transmitting an IGMP Leave network message for a fourth multicast group of the plurality of multicast groups that is currently inactive.

5. The method of claim 4, further comprising:
upon receiving a current segment from the third multicast group, transmitting an IGMP Leave network message for the third multicast group; and
transmitting a request for unicast data for a next segment of the streaming video content.

6. The method of claim 1, further comprising:
storing received data for the streaming video content in a video data cache on a network gateway device.

7. The method of claim 6, further comprising:
receiving, from a client device, a unicast request for data for the streaming video content; and
fulfilling the unicast request by transmitting data from the video data cache on the network gateway device to the client device.

8. A network device, comprising:
a plurality of network ports; and
a processor configured to perform an operation, comprising:
determining that a first multicast group of a plurality of multicast groups for streaming video content is currently active in response to determining to initiate multicast network communications for the streaming video content;
transmitting an Internet Group Management Protocol (IGMP) Join network message for a second multicast group of the plurality of multicast groups that is currently inactive; and
upon determining that the first multicast group is currently inactive, transmitting an IGMP Join network message for the first multicast group, wherein the streaming video content is divided across the plurality of multicast groups, such that each segment of the streaming video content is assigned to one of the plurality of multicast groups, and wherein each successive video segment after a first video segment is assigned to a different multicast group, relative to the video segment immediately prior.

9. The network device of claim 8, wherein determining that a first multicast group of a plurality of multicast groups for the streaming video content is currently active further comprises:
parsing a manifest file for the streaming video content to determine the first multicast group is currently active.

10. The network device of claim 9, the operation further comprising:
parsing the manifest file for the streaming video content to determine the second multicast group and to determine a time at which the second multicast group will be active.

11. The network device of claim 8, the operation further comprising:
upon determining to transition from multicast network communications to unicast network communications:
determining a third multicast group of the plurality of multicast groups is currently active; and
transmitting an IGMP Leave network message for a fourth multicast group of the plurality of multicast groups that is currently inactive.

12. The network device of claim 11, the operation further comprising:
upon receiving a current segment from the third multicast group, transmitting an IGMP Leave network message for the third multicast group; and
transmitting a request for unicast data for a next segment of the streaming video content.

13. The network device of claim 8, the operation further comprising:

storing received data for the streaming video content in a video data cache on a network gateway device.

14. The network device of claim 13, the operation further comprising:

receiving, from a client device, a unicast request for data for the streaming video content; and fulfilling the unicast request by transmitting data from the video data cache on the network gateway device to the client device.

15. A content distribution network, comprising:

a memory storing an instance of digital video content comprising a plurality of video segments;

logic configured to, by operation of one or more computer processors:

assign each of the plurality of video segments to a respective one of a plurality of multicast streams, wherein each video segment is assigned to a single multicast stream and wherein each successive video segment after a first video segment is assigned to a different multicast stream from the immediately prior video segment;

generate a manifest file for the instance of digital video content, wherein the manifest file includes a proprietary tag that specifies a next multicast stream of the plurality of multicast streams, and a time stamp at which the next multicast stream will become active; and transmit the plurality of video segments for the instance of digital video content using the plurality of multicast streams, wherein the plurality of video segments are transmitted on the assigned multicast streams.

16. The content distribution network of claim 15, wherein the logic is further configured to:

generate an updated manifest file for the instance of digital video content, wherein the updated manifest file includes a second proprietary tag that specifies a new currently active multicast stream of the plurality of multicast streams, a new next multicast stream of the plurality of multicast streams, and a time stamp at which the new next multicast stream will become active.

17. The content distribution network of claim 15, wherein the logic is further configured to:

upon receiving a request from a client device to stream the instance of digital video content over unicast network communications, transmitting at least one of the plurality of video segments to the client device.

18. The content distribution network of claim 15, wherein the plurality of multicast streams comprises a first multicast stream and a second multicast stream, and wherein the logic is configured to assign each of the plurality of video segments to a respective one of a plurality of multicast streams by alternating assignments of sequential video segments in the plurality of video segments between the first multicast stream and the second multicast stream.

* * * * *